United States Patent Office 3,636,025
Patented Jan. 18, 1972

3,636,025
TRIALKYLSILYLMETHYL GUANIDINIUM SALTS
Sandor Barcza, West Orange, N.J., assignor to
Sandoz-Wander, Inc., Hanover, N.J.
No Drawing. Filed Jan. 26, 1970, Ser. No. 5,892
Int. Cl. C07f 7/10; A61k 27/00
U.S. Cl. 260—448.2 N
4 Claims

ABSTRACT OF THE DISCLOSURE

Tri(lower) alkylsilylmethyl guanidinium salts, e.g., trimethylsilylmethyl guanidinium nitrate, are obtainable by guanylating a tri(lower) alkylsilylmethylamine, e.g., with a 1-guanyl-3,5-dimethylpyrazole salt, and are useful as anti-inflammatory agents.

---

This invention relates to silane derivatives, and more particularly to tri(lower)alkylsilylmethyl guanidinium salts, as well as to pharmaceutically useful compositions containing said silane compounds and to the use of such compositions.

The tri(lower) alkylsilylmethyl guanidinium compounds of this invention, may be conveniently represented by the Formula I:

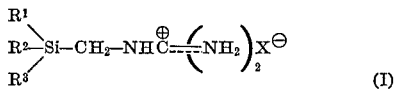

(I)

wherein each of $R^1$, $R^2$ and $R^3$ is, independently, lower alkyl, e.g. having from 1 to 4 carbon atoms, such as methyl, ethyl, propyl and butyl, and isomers thereof; $R^1$, $R^2$ and $R^3$ are preferably the same, and are preferably unbranched at the alpha-carbon atom, such as methyl; and X is a non-toxic pharmaceutically acceptable organic anion, such as the residue of a lower alkanoic acid, e.g. acetate, or an inorganic anion such as the residue of a mineral acid, e.g. a halide having a molecular weight of from 35 to 127, i.e. chloride, bromide or iodide, sulfate, phosphate or nitrate.

The tri(lower)alkylsilylmethyl guanidinium salts, i.e. Compounds I, are obtainable by reacting an appropriate tri(lower)alkylsilylmethylamine, i.e. a compound of the Formula II:

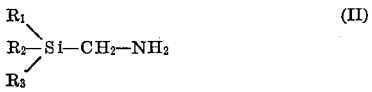

(II)

wherein $R^1$, $R^2$ and $R^3$ are as defined above, with a guanylating agent, i.e. a Compound III.

The guanylation of the tri(lower)alkylsilylmethylamine (II) may be carried out in the conventional manner for guanylating an amine, for example, using the general methods described by Bannard et al. in the "Canadian Journal of Chemistry" 36, 1541, (1958), wherein guanylating agents, e.g., 1-guanyl-3,5-dimethylpyrazole nitrate and S-methylisothiouronium sulfate, are discussed.

The guanylating reaction may be conveniently carried out at temperatures of from about 30° to 150° C., preferably in the substantial absence of water. It is preferred to carry out the reaction in a polar medium, e.g. a lower alkanol, such as ethanol or butanol, or an ether, e.g. tetrahydrofuran or dioxane, and preferably at the reflux temperature of the medium, e.g. at 75 to 120° C. Mediums of the protic type, e.g. ethanol or butanol, are particularly preferred.

The tri(lower)alkylsilylmethylamines (Compounds II) and granylating agents (Compounds III) are known and may be prepared as described in the literature, or where not known may be prepared in a manner analogous to that described in the literature for preparing known compounds.

The Compounds I of this invention are useful as anti-inflammatory agents as they possess anti-inflammatory activity. The above-mentioned activity of these compounds is indicated by their activity in rats using the acute carrageenan-induced edema procedure substantially as described by Winter (Proc. Soc. Exp. Biol., 111, 544, (1962).

For such usage, the compounds may be administered orally or parenterally as such or admixed with conventional pharmaceutical carriers. They may be administered orally in such forms as tablets, dispersible powders, granules, capsules, syrups and elixirs, and parenterally as solutions, suspensions, dispersions, emulsions, and the like, e.g., a sterile injectable aqueous suspension. The compositions for oral use may contain one or more conventional adjuvants, such as sweetening agents, flavoring agents, coloring agents and preserving agents, in order to provide an elegant and palatable preparation. Tablets may contain the active ingredient in admixture with conventional pharmaceutically acceptable excipients, e.g., inert diluents, such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and absorption in the gastro-intestinal tract and thereby provide a sustained action over a longer period. Similarly, suspensions, syrups and elixirs may contain the active ingredient in admixture with any of the conventional excipients utilized for the preparaton of such compositions, e.g., suspending agents (methylcellulose, tragacanth and sodium alginate), wetting agents (lecithin, polyoxyethylene stearate and polyoxyethylene sorbitan mono-oleate) and preservatives (ethyl-p-hydroxybenzoate). Capsules may contain the active ingredient alone or admixed with an inert solid diluent, e.g., calcium carbonate, calcium phosphate and kaolin. The injectable compositions are formulated as known in the art and may contain appropriate dispersing or wetting agents and suspending agents identical or similar to those mentioned above. These pharmaceutical preparations may contain about 10–90% of the active ingredient in combination with the carrier or adjuvant.

The dosage of active ingredient employed for the alleviation of inflammation may vary depending on the particular compound employed and the severity of the condition being treated. However, in general, satisfactory results are obtained when the Compounds (I) are administered at a daily dosage orally of from about 2 milligrams to about 200 milligrams per kilogram of animal body weight, preferably given in divided doses two to four times a day, or in sustained release form. For most large mammals, the total daily oral dosage is from about 150 milligrams to about 2,000 milligrams. Dosage forms suitable for internal use comprise from about 0.5 milligrams to about 100 milligrams of the active compound.

The preferred pharmaceutical compositions from the standpoint of preparation and ease of administration are solid compositions, particularly hard-filled capsules and tablets.

Capsules suitable for oral administration which contain the following ingredients are prepared in a conventional manner. Such capsules are useful in treating inflammation at a dose of one capsule 2–4 times a day.

Ingredient: Parts by weight
Trimethylsilylmethyl guanidium nitrate _____ 50
Inert solid diluent (starch, lactose, kaolin) ____ 450

The following example is presented as illustrative of this invention.

EXAMPLE

Trimethylsilylmethyl guanidinium nitrate

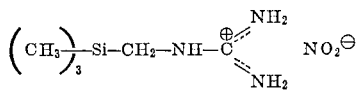

In 650 ml. of absolute ethanol, 25.5 g. (247.5 mmoles) of trimthylsilylmthylamin and 25.5 g. (127 mmols) of 1-guanyl - 3,5 - dimethylpyrazole nitrate salt are refluxed for 5 hours. The ethanol solvent and volatile amine compounds are distilled off under vacuum to obtain a residue. The residue is stirred with 400 ml. of acetone and upon crystallization yields the title product, M.P. 160–165° C. By concentrating the mother liquor to 50 ml., adding 100 ml. of diethyl ether thereto, filtering, drying and crystallizing, additional title product is obtained, M.P. 160–165° C.

What is claimed is:

1. A compound of the formula

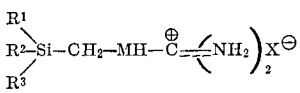

wherein
each of $R^1$, $R^2$ and $R^3$ is, independently, lower alkyl; and
X is a non-toxic pharmaceutically acceptable organic or inorganic anion.

2. A compound of claim 1 wherein $R^1$, $R^2$ and $R^3$ are the same.

3. A compound of claim 1 wherein X is an inorganic anion.

4. The compound of claim 3 which is trimethylsilylmethyl guanidinium nitrate.

References Cited

Chemical Abstracts, 66, 85854 a, 1967.

JOBIAS E. LEVOW, Primary Examiner

P. F. SHAVER, Assistant Examiner

U.S. Cl.X.R.

424—184

UNITED STATES PATENT AND TRADEMARK OFFICE
CERTIFICATE OF CORRECTION

PATENT NO. : 3,636,025
DATED : January 18, 1972
INVENTOR(S) : Sandor Barcza

It is certified that error appears in the above-identified patent and that said Letters Patent are hereby corrected as shown below:

Column 4, Claim 1, delete present structure and insert therefor --

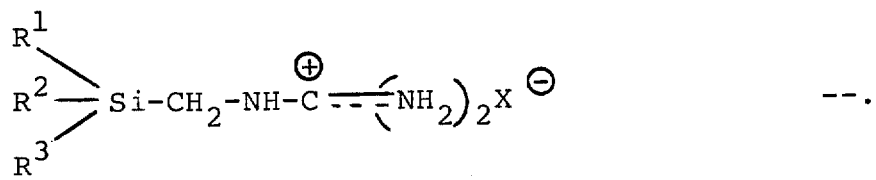

--.

Signed and Sealed this twenty-sixth Day of August 1975

[SEAL]

Attest:

RUTH C. MASON
*Attesting Officer*

C. MARSHALL DANN
*Commissioner of Patents and Trademarks*